United States Patent Office 3,236,533
Patented Feb. 22, 1966

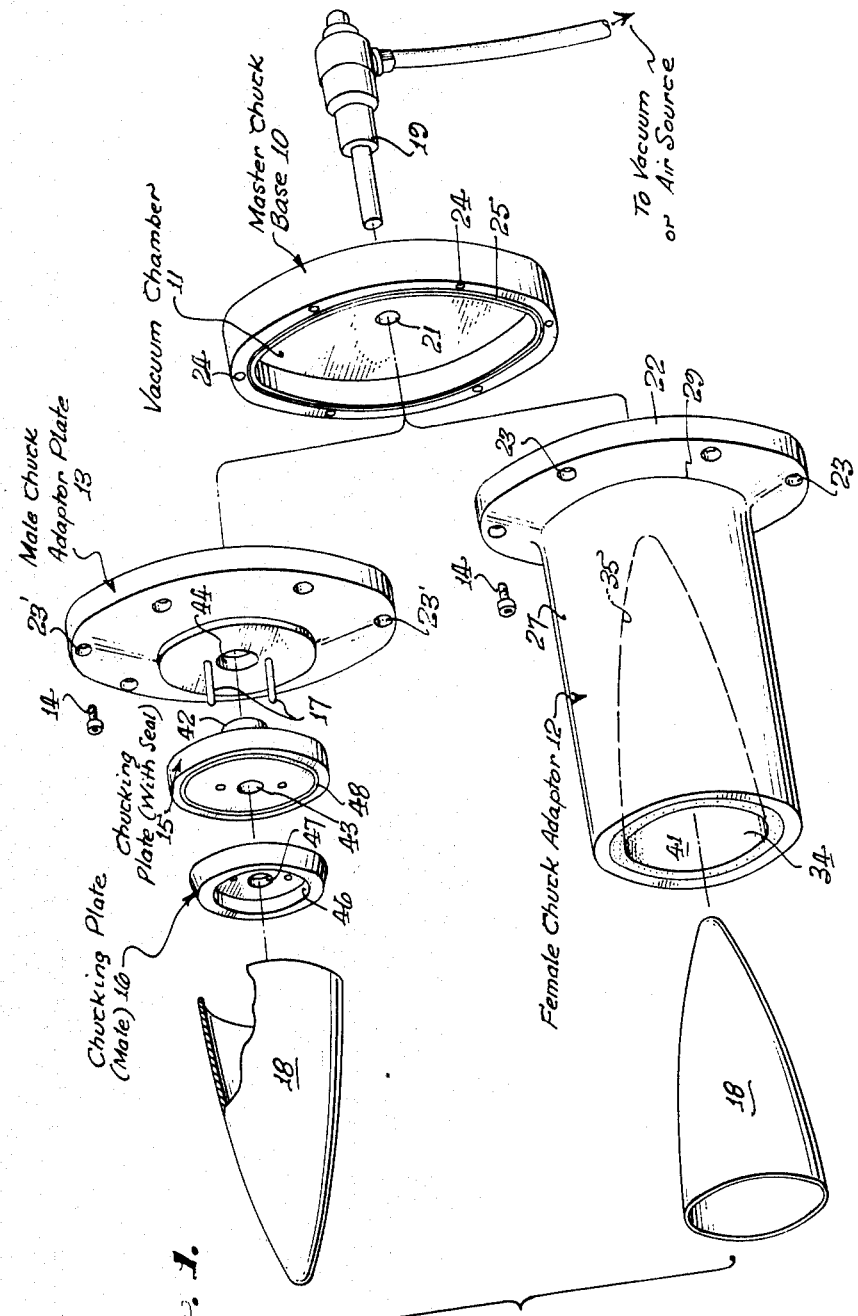

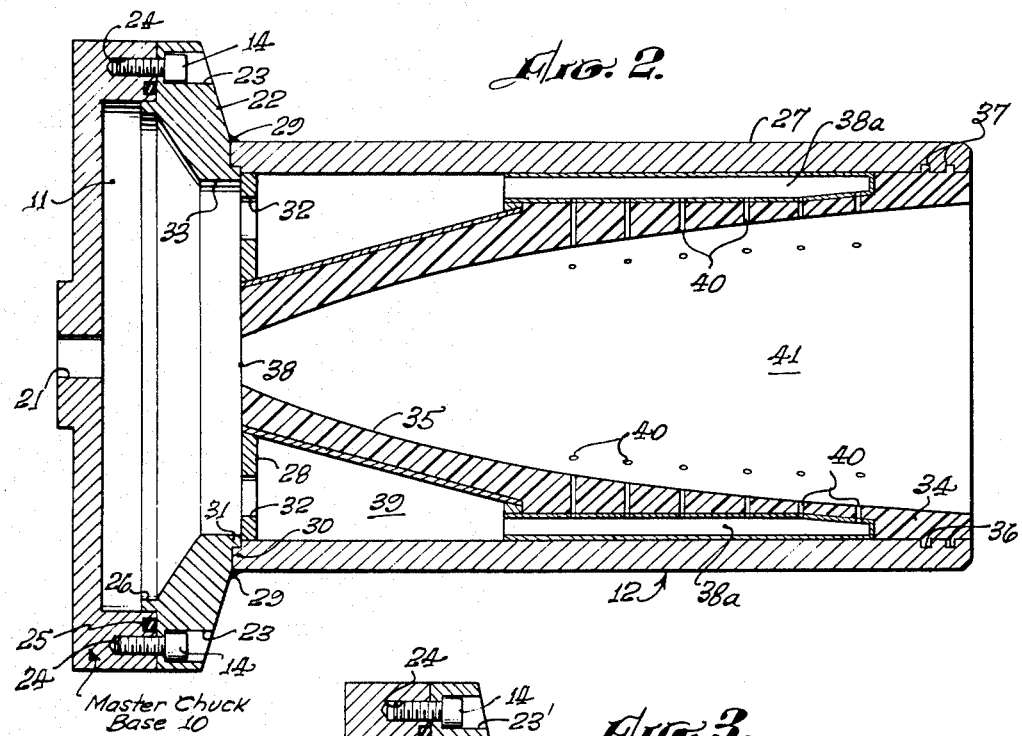
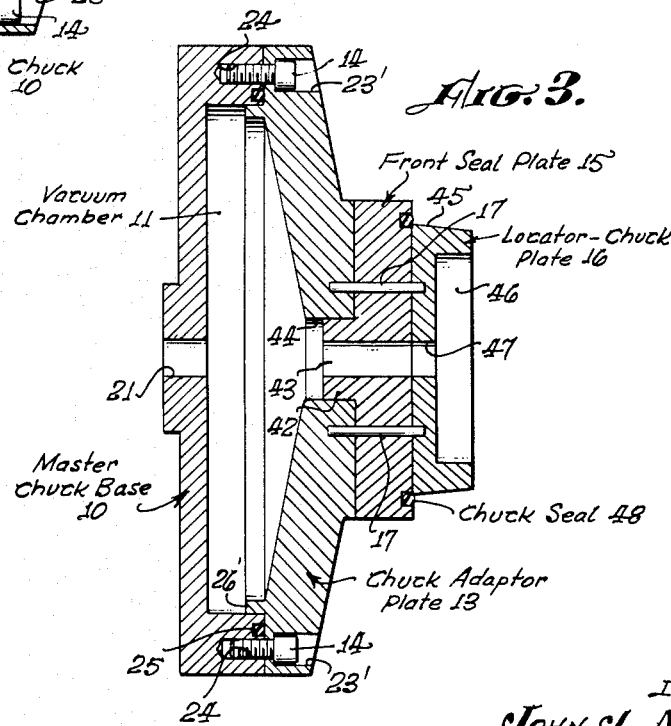

3,236,533
VACUUM CHUCK ASSEMBLY
John J. Mullion, Fullerton, Calif., assignor to General Dynamics Corporation, Pomona, Calif., a corporation of Delaware
Filed Sept. 24, 1964, Ser. No. 399,038
9 Claims. (Cl. 279—3)

This invention relates to chucks, particularly to vacuum chucks, and more particularly to a vacuum chuck that is adapted to handle both male and female workpiece holders.

Devices for holding objects have long been known. However, the present day requirements have, in many instances, shown a need for which the prior known holding devices fail to provide. An example of the present day need is to hold material or objects which are easily damaged while the same is operated upon or manipulated, such as rubbed, polished, covered, coated, turned, spun and the like. In assemblies, such as radomes, a certain configuration and thickness is required for effective operation, and any holding device which damages the assemblies cannot be utilized.

Therefore, it is an object of this invention to provide a holding device or chuck.

A further object of the invention is to provide a vacuum chuck assembly.

Another object of the invention is to provide a vacuum chuck for holding an element, without damage thereto, while the element is being operated upon or manipulated.

Another object of the invention is to provide a vacuum chuck having a base assembly which is adapted to utilize either male or female adaptors.

Other objects of the invention will become readily apparent from the following description and accompanying drawings wherein:

FIG. 1 is an exploded perspective view of the invention exemplifying the material to be held thereby;

FIG. 2 is a cross-sectional view of the FIG. 1 device showing the female adaptor positioned in the chuck base; and FIG. 3 is a view similar to FIG. 2 but showing the male adaptor positioned in the chuck base.

Broadly, the vacuum chuck assembly of the invention comprises a master base element adapted for use either with a male or female workpiece supporting member. The male configuration utilizes an adaptor plate assembly which is secured to the chuck base and which is secured by vacuum to the workpiece. The female adaptor comprises an adaptor plate assembly which is secured to the base, and which includes a central opening therein for accommodating the workpiece in close fitting relationship. The wall section of the central opening in the female configuration includes apertures communicating with a vacuum source to that the workpiece may be held by vacuum within the chuck, and the wall sections may be molded to an exact configuration approximating the curvature of the workpiece to be held.

Referring now to the drawings, the invention as broadly illustrated in FIG. 1 comprises a master chuck base 10 defining therein a vacuum chamber 11 and adapted to support either a female chuck adaptor 12 or a male chuck adaptor plate 13 via means such as cap screws 14 (see FIGS. 2 and 3). A front seal or chucking plate 15 and a chucking or locator plate 16 are aligned with adaptor plate 13 via dowels 17. A workpiece 18, such as a radome which requires precise machining, is shown adjacent the outer end of the female chuck adaptor 12 while the reverse end of workpiece 18 is shown adjacent the chucking plate 16 of the chuck adaptor 13. Vacuum chamber 11 is operatively connected to a vacuum source (not shown) via a rotating union indicated at 19. Union 19 may be additionally or alternately connected to an air supply.

As shown in FIG. 2, the female adaptor chuck 12 is attached to the master chuck base 10. The vacuum chamber 11 is connected to rotating union 19 via an aperture 21. Adaptor chuck 12 comprises a plate 22 having countersunk apertures 23 therein through which cap screws 14 pass to engage corresponding threaded holes 24 in base 10. To provide a seal between base 10 and plate 22 a sealing member 25, such as an O-ring, is positioned in a groove in base 10; and plate 22 is provided with a flange or pilot member 26 which has an external diameter which fits tightly in cooperation with internal diameter of the portion of base 10 which defines chamber 11. An open end cylinder-like member or shell 27 is attached at the closed end plate 28 thereof to plate 22 by means such as welding indicated at 29 or by dowels (not shown), end plate 28 being slightly recessed so as to define a flange portion 30 which surrounds a flange portion or shoulder 31 of plate 22. End plate 28 is provided with a plurality of apertures indicated at 32 which interconnect the interior of cylinder-like member 27 with vacuum chamber 11 via an aperture 33 in plate 22. A chucking member or holding surface 34 having a tapering inner end 35 is positioned in member or shell 27 and held therein by tongues 36 on chucking member 34 which fit in grooves 37 in member or shell 27. The inner end 35 of member 34 has an aperture 38 therein and is positioned within a central aperture in end plate 28. Chucking member 34 is provided with a plurality of tubes or cavities 38a (only two shown) which communicate with vacuum chamber 11 via a chamber 39 defined by member 34 and shell 27, apertures 32 and aperture 33. A plurality of passageways 40 extend from cavities 38a to the internal surface area of member or surface 34, thereby connecting the interior area 41 of member or shell 27 with the vacuum chamber 11.

Referring now to the male chuck assembly as shown in FIG. 3, like reference numerals indicate similar elements described above with respect to FIGS. 1 and 2. Chuck adaptor plate 13 is attached to master chuck base 10 via cap screws 14 which extend through countersunk apertures 23′ in plate 13 into threaded holes 24 in base 10. A sealing member 25 is positioned between base 10 and plate 13 while plate 13 includes a flange 26′ which cooperates with the wall of base 10 in the same manner as described above with respect to FIG. 2. Front seal plate 15 includes a protruding flange 42 and a central bore 43 so that when plate 15 is abutted against plate 13 flange 42 extends into an aperture 44 in adaptor plate 13. The locator or chuck plate 16 has an external tapered holding surface indicated at 45 which is contoured to shape of the workpiece to be supported thereby, such as the internal configuration of radome 18. Chuck plate 16 additionally is provided with counter bore 46 and a central bore 47, central bore 47 aligning with bore 43 of plate 15 so that counter bore 46 is in communication with vacuum chamber 11. A seal 48, such as an O-ring, is positioned in a groove in plate 15 and between plates 15 and 16, seal 48 also serving as a stop for the associated workpiece.

The master chuck base and the chuck adaptor plates 13 and 22, and the member or shell 27 of the female chuck assembly may be made of a metal or metallic alloy. The chucking member or holding surface 34 of the female assembly may be made of a castable non-metallic material, i.e., plastic, rubber, etc. The chuck plates 15 and 16 of the male assembly may be made of a metal, metallic alloy, or non-mentallic material. The locator or chucking plate 16 and the holding surfaces 34 and 45 are cast to the desired shape and can be removed and replaced with various shapes for holding different configured workpieces.

In operation, either the male assembly or the female assembly is attached to the master chuck base 10 via cap screws 14. The vacuum source is activated which creates a vacuum in chamber 11, bores 43 and 47, and countersink 46 in the FIG. 3 application or chambers 11, 39 and 41 via apertures 32, tubes 38a and passageways 40 or via aperture 38 in the FIG. 2 application, thereby creating a holding force on the workpiece associated therewith so that said workpiece may be accurately held for machining or other operation thereon. To release the workpiece from the chuck, the vacuum source is cut-off and chamber 11, etc., again reverts to atmospheric pressure or an air supply source can be connected to chamber 11 to assist in removing the workpiece.

It has thus been shown that this invention provides a vacuum chuck which utilizes a master or universal base to which either male or female adaptors can be easily and quickly attached, the adaptors being contoured so as to support a desired workpiece which is held thereon by vacuum applied to the chuck, thus providing a sufficient holding force on the workpiece without damage thereof.

While specific embodiments of the invention have been illustrated and described, modifications thereof will be apparent to those skilled in the art, and it is intended to cover in the appended claims all such modifications as come within the spirit and scope of the invention.

What I claim is:

1. A device for holding objects comprising a base member, said base member defining a vacuum chamber, an aperture in said base member adapted to interconnect said vacuum chamber with a vacuum source, removable plate means operatively connected with said base member, means including means adapted for supporting an object to be held operatively connected to said plate means, each of said means being provided with at least one aperture for providing a vacuum interconnection between each of said last mentioned means and said vacuum chamber.

2. The device defined in claim 1 additionally including sealing means between said base member and said removable plate means.

3. The device defined in claim 2, wherein said sealing means comprises a seal positioned in a groove in said base member and abutting against said removable plate means, and a flange integral with said removable plate means cooperating with a portion of said base member.

4. A vacuum chuck assembly comprising a master chuck base, a removable chuck adaptor, and means for removably interconnecting said base and said adaptor; said master chuck base including a countersunk portion and an aperture adapted to interconnect said countersunk portion with a vacuum source; said removable chuck adaptor including a plate-like member having a flange-like portion adapted to cooperate with a wall surface of the countersunk portion of said chuck base for aligning said chuck adaptor with said chuck base and for providing a sealing surface therebetween, a seal member located in a groove in said chuck and adapted to abut against said plate-like member of said chuck adaptor, workpiece holding means operatively connected with said plate-like member, said workpiece holding means and said plate-like member being provided with aperture means for communication with said countersunk portion of said master chuck base, whereby the creation of a vacuum within said countersunk portion of said chuck base and said aperture means in said chuck adaptor provides a holding force for supporting an associated workpiece.

5. A vacuum chuck comprising a master chuck base, a removable chuck adaptor, and means for removably interconnecting said base and said adaptor; said master chuck base including a countersunk portion and an aperture adapted to interconnect said countersunk portion with a vacuum source; said removable chuck adaptor including a plate-like member having a portion thereof adapted to cooperate with said chuck base for aligning said chuck adaptor with said chuck base, a seal member located between said plate-like member of said chuck adaptor and said chuck base, workpiece holding means operatively connected with said plate-like member, said workpiece holding means and said plate-like member being provided with aperture means for communication with said countersunk portion of said master chuck base, whereby the creation of a vacuum within said countersunk portion of said chuck base and said aperture means of said chuck adaptor provides a direct holding force for supporting an associated workpiece.

6. A vacuum chuck assembly comprising a master chuck base, a removable chuck adaptor, and means for removably interconnecting said base and said adaptor; said master chuck base including a countersunk portion and an aperture adapted to interconnect said countersunk portion with a vacuum source; said removable chuck adaptor including a plate-like member having a portion thereof adapted to cooperate with said chuck base for aligning said chuck adaptor with said chuck base, a seal member located between said plate-like member of said chuck adaptor and said chuck base, workpiece holding means operatively connected with said plate-like member, said workpiece holding means and said plate-like member being provided with aperture means for communication with said countersunk portion of said master chuck base, whereby the creation of a vacuum within said countersunk portion of said chuck base and said aperture means of said chuck adaptor provides a holding force for supporting an associated workpiece; said workpiece holding means including a pair of plates, one of said plates including a protruding portion and an aperture extending therethrough, said protruding portion being positioned within the aperture of said plate-like member when said one plate abuts said plate-like member, the other of said plates having an external surface configured to conform with the configuration of the associated workpiece to be held thereby, said other plate also including a countersunk portion and an aperture extending therethrough, said aperture of said other plate aligning with said aperture in said one plate when said other plate abuts said one plate, and seal means positioned between said pair of plates and adapted to additionally serve as a stop member for an associated workpiece.

7. A vacuum chuck assembly comprising a master chuck base, a removable chuck adaptor, and means for removably interconnecting said base and said adaptor; said master chuck base including a countersunk portion and an aperture adapted to interconnect said countersunk portion with a vacuum source; said removable chuck adaptor including a plate-like member having a portion thereof adapted to cooperate with said chuck base for aligning said chuck adaptor with said chuck base, a seal member located between said plate-like member of said chuck adaptor and said chuck base, workpiece holding means operatively connected with said plate-like member, said workpiece holding means and said plate-like member being provided with aperture means for communication with said countersunk portion of said master chuck base, whereby the creation of a vacuum within said countersunk portion of said chuck base and said aperture means of said chuck adaptor provides a holding force for supporting an associated workpiece, said workpiece holding means including a first member closed at one end thereof, said closed-end of said first member being provided with a plurality of apertures therethrough, and a second member operatively positioned within said first member, said second member having at least one open end, a portion of said second member being spaced from said first member so as to define a chamber, said chamber being in communication with said certain of said apertures in the closed-end of said first member, another portion of said second member being provided with a plurality of cavities, said cavities being in communication with said member, and at least one passageway extending from each of said cavities to the internal area of said second member.

8. The vacuum chuck assembly defined in claim 7, wherein said plurality of apertures in the closed-end of said first member includes a central aperture, and wherein said second member is open at each end thereof, and the end of said second member defining said chamber is positioned in said central aperture.

9. The vacuum chuck assembly defined in claim 7, wherein said second member is retained in said first member by groove means in said first member and cooperating tongue means on said second member.

References Cited by the Examiner

UNITED STATES PATENTS

| 1,618,378 | 2/1927 | Hatcher | 269—21 |
| 2,203,572 | 6/1940 | Johnson | 269—21 |
| 2,380,509 | 7/1945 | Emerson | 269—21 |
| 2,966,010 | 12/1960 | Guignard | 51—235 |
| 3,147,017 | 9/1964 | Dunham | 279—3 |

ROBERT C. RIORDON, *Primary Examiner.*

LESTER M. SWINGLE, *Examiner.*

H. V. STAHLHUTH, *Assistant Examiner.*